(12) United States Patent
Hara

(10) Patent No.: US 6,771,702 B1
(45) Date of Patent: Aug. 3, 2004

(54) IMAGE TRANSMISSION METHOD AND APPARATUS USING A PLURALITY OF SERVICE CLASSES OF ATM LAYER OF ONE IMAGE DATA

(75) Inventor: Minori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/439,993

(22) Filed: Nov. 15, 1999

(30) Foreign Application Priority Data

Nov. 13, 1998 (JP) .......................................... 10-323125

(51) Int. Cl.[7] .............................. H04N 7/12; G06K 9/46
(52) U.S. Cl. ................ 375/240.03; 382/251; 370/395.1
(58) Field of Search .............................. 370/389, 395.1, 370/395.6, 395.61, 395.64, 905, 465, 468, 474; 375/240.03, 240.22, 245; 382/250, 251

(56) References Cited

U.S. PATENT DOCUMENTS 5,046,121 A * 9/1991 Yonekawa et al. .......... 382/250
5,140,417 A * 8/1992 Tanaka et al. ......... 375/240.01
6,034,945 A * 3/2000 Hughes et al. .............. 370/230
6,233,359 B1 * 5/2001 Ratnakar et al. ............ 382/250

FOREIGN PATENT DOCUMENTS

| JP | 5-235985 | 9/1993 |
|----|----------|--------|
| JP | 05-235985 A | 9/1993 |
| JP | 06-046394 A | 2/1994 |
| JP | 10-013416 A | 1/1998 |

* cited by examiner

Primary Examiner—Steven H. D. Nguyen
Assistant Examiner—Phuongchau Ba Nguyen
(74) Attorney, Agent, or Firm—Foley & Lardner LLP

(57) ABSTRACT

In an image transmission method using an asynchronous transfer mode (ATM) network, one image data is divided into a plurality of groups each corresponding to one traffic service class of an ATM layer in accordance with frequency components of the image data, and virtual connections (VCs) are established for the traffic service classes. Then, each group of the image data is transmitted by the corresponding virtual connection.

6 Claims, 14 Drawing Sheets

EXAMPLE OF f(i,j)

| j \ i | 0 | 1 | 2 | 3 | 4 | 5 | 6 | 7 |
|---|---|---|---|---|---|---|---|---|
| 0 | 79 | 75 | 79 | 82 | 82 | 86 | 94 | 94 |
| 1 | 76 | 78 | 76 | 82 | 83 | 86 | 85 | 94 |
| 2 | 72 | 75 | 67 | 78 | 80 | 78 | 74 | 82 |
| 3 | 74 | 76 | 75 | 75 | 86 | 80 | 81 | 79 |
| 4 | 73 | 70 | 75 | 67 | 78 | 78 | 79 | 85 |
| 5 | 69 | 63 | 68 | 69 | 75 | 78 | 82 | 80 |
| 6 | 76 | 76 | 71 | 71 | 67 | 79 | 80 | 83 |
| 7 | 72 | 77 | 78 | 69 | 75 | 75 | 78 | 78 |

EXAMPLE OF d(u,v)

| v \ u | 0 | 1 | 2 | 3 | 4 | 5 | 6 | 7 |
|---|---|---|---|---|---|---|---|---|
| 0 | 1643 | 995 | 1032 | 1026 | 1025 | 1021 | 1024 | 1025 |
| 1 | 1046 | 1018 | 1020 | 1024 | 1032 | 1024 | 1022 | 1021 |
| 2 | 1035 | 1024 | 1029 | 1020 | 1021 | 1028 | 1024 | 1021 |
| 3 | 1032 | 1014 | 1029 | 1024 | 1024 | 1031 | 1027 | 1026 |
| 4 | 1030 | 1026 | 1023 | 1023 | 1021 | 1024 | 1024 | 1032 |
| 5 | 1025 | 1026 | 1025 | 1026 | 1024 | 1026 | 1022 | 1022 |
| 6 | 1026 | 1022 | 1020 | 1025 | 1026 | 1025 | 1023 | 1025 |
| 7 | 1021 | 1025 | 1029 | 1022 | 1027 | 1023 | 1025 | 1021 |

Fig. 7

EXAMPLE OF q(u,v)

| v \ u | 0 | 1 | 2 | 3 | 4 | 5 | 6 | 7 |
|---|---|---|---|---|---|---|---|---|
| 0 | 160 | 110 | 100 | 160 | 240 | 400 | 510 | 610 |
| 1 | 120 | 120 | 140 | 190 | 260 | 580 | 600 | 550 |
| 2 | 140 | 130 | 160 | 240 | 400 | 570 | 690 | 560 |
| 3 | 140 | 170 | 220 | 290 | 510 | 870 | 800 | 620 |
| 4 | 180 | 220 | 370 | 560 | 680 | 1090 | 1030 | 770 |
| 5 | 240 | 350 | 550 | 640 | 810 | 1040 | 1130 | 920 |
| 6 | 490 | 640 | 780 | 870 | 1030 | 1210 | 1200 | 1010 |
| 7 | 720 | 920 | 950 | 980 | 1120 | 1000 | 1030 | 990 |

EXAMPLE OF qd(u,v)

| v\u | 0 | 1 | 2 | 3 | 4 | 5 | 6 | 7 |
|---|---|---|---|---|---|---|---|---|
| 0 | 10 | 9 | 10 | 6 | 4 | 2 | 2 | 1 |
| 1 | 8 | 9 | 7 | 5 | 3 | 1 | 1 | 1 |
| 2 | 7 | 7 | 6 | 4 | 2 | 1 | 1 | 1 |
| 3 | 7 | 5 | 4 | 3 | 2 | 1 | 1 | 1 |
| 4 | 5 | 4 | 2 | 1 | 1 | 0 | 0 | 1 |
| 5 | 4 | 2 | 1 | 1 | 1 | 0 | 0 | 1 |
| 6 | 2 | 1 | 1 | 1 | 0 | 0 | 0 | 1 |
| 7 | 1 | 1 | 1 | 1 | 0 | 1 | 0 | 1 |

Fig. 11

| qd | HUFFMAN CODE |
|---|---|
| qd1 | 00 |
| qd2 | 010 |
| qd3 | 011 |
| qd4 | 100 |
| qd5 | 101 |
| qd6 | 110 |
| qd7 | 1110 |
| qd8 | 11110 |
| qd9 | 111110 |
| qd10 | 1111110 |
| qd11 | 11111110 |
| qd12 | 111111110 |
| ⋮ | ⋮ |

IMAGE TRANSMISSION METHOD AND APPARATUS USING A PLURALITY OF SERVICE CLASSES OF ATM LAYER OF ONE IMAGE DATA

BACKGROUND OF THE INVENTION

1. Field of the Invention

The present invention relates to an asynchronous transfer mode (ATM) communication system, and more particularly, to an image transmission method and apparatus capable of effectively transmitting image data without deteriorating the quality of service (QoS) even when an ATM network is congested.

2. Description of the Related Art

Recently, ATM communication systems have been developed to realize a broadband integrated services digital network (B-ISDN).

In the ATM communication system, all multi-media information related to audio, video and data are stored in fixed length cells each formed by a header (5 bytes) and a payload (48 bytes). Since the cells have the same configuration, it is possible to multiplex, demultiplex and switch in the same network at different rates regardless of the kind of multimedia.

In the ATM communication system, if an abnormally large number of cells are supplied to a network, it is impossible to guarantee quality of service (QoS). This state is called a congested state.

In order to suppress the generation of congested states, various ATM traffic service classes, i.e., a constant bit rate (CBR) service, a real-time variable bit rate (rt-VBR) service, a non-real-time variable bit rate (nrt-VBR) service, an unspecified bit rate (UBR) service and an available bit rate (ABR) service are defined in the ATM communication system. Note that the CBR service is of a band guaranteeing type, and the rt-VBR services the nrt-VBR service, the UBR service and the ABR service are of a best effort type.

Also, when a virtual connection (VC) is established between a terminal and the ATM network, traffic parameters such as a peak cell rate (PCR), a substainable cell rate (SCR) and the like as well as a required quality of service QoS are declared for each of the above-mentioned traffic service classes.

In the CBR service, a fixed cell rate is allocated to each connection between a terminal and the ATM network. The CBR service is applied to a real-time moving image/speech service, a line exchange emulation service and the like. Since the cell rate is fixed, the peak cell rate PCR as well as the quality of service QoS is declared but the substainable cell rate SCR is not declared. However, if one image data is transmitted via the ATM network by using only the CBR service, an enormously large band of the ATM network is exhausted, so that effective use is not made of the band of the ATM network.

In the VBR service, a statistically-determined variable cell rate is allocated to each connection between a terminal and the ATM network. For example, the rt-VBR service is applied to a variable rate video and speech. Also, the nrt-VBR service is applied to a non-real-time type data communication service such as a frame relay service of a public network. In the VBR service class, the peak cell rate PCR and the substainable cell rate SCR as well as the quality of service QoS are both declared.

However, if one image data is transmitted via the ATM network by using only the rt-VBR service or the nrt-VBR service, many other traffic parameters such as a maximum burst size (MBS) are needed to be declared for every frequency component, so that it is difficult to uniformly define a burst model.

In the UBR service, a cell rate is determined by a terminal, that is, the control of cell rates by the ATM network is not carried out. In the UBR service, only the peak cell rate PCR is declared, and other traffic parameters as well as the quality of service QoS are not declared.

However, if one image data is transmitted via an ATM network by using only the UBR service, the important low frequency components are treated equally to the non-important high frequency components. As a result, when the ATM network is congested, the cells of the important low frequency components may be scrapped, which would not guarantee the quality of service QoS.

In the ABR service, an allowed cell rate (ACR) is calculated in accordance with congestion information fed back from the ATM network, and also, the allowed cell rate ACR is changed between a minimum cell rate (MCR) and a peas cell rate PCR. That is, $$MCR \leq ACR \leq PCR$$

Thus, a feedback operation using the congestion information is performed upon the ACR, which effectively makes use of the bandwidth of the ATM network.

However, if one image data is transmitted via the ATM network by using only the ABR service, the feedback control of congestion information would make the control of the ATM network complex.

SUMMARY OF THE INVENTION

It is an object of the present invention to provide an image transmission method and apparatus using an ATM network capable of effectively using the band of the ATM network without reducing the quality of service even when the ATM network is congested.

According to the present invention, in an image transmission method using an ATM network, one image data is divided into a plurality of groups each corresponding to one traffic service class of an ATM layer in accordance with frequency components of the image data, and virtual connections (VCs) are established for the traffic service classes. Then, each group of the image data is transmitted by the corresponding virtual connection. Thus, if a band guaranteeing type traffic service such as the CBR service is defined for the low frequency component of the image data requiring a high quality of service and a best effort type traffic service class such as the VBR service, the UBR service or the ABR service is defined for the high frequency component of the image data requiring a low quality of service, effective use is made of the band of the ATM network.

BRIEF DESCRIPTION OF THE DRAWINGS

The present invention will be more clearly understood from the description set forth below, with reference to the accompanying drawings, wherein:

FIG. 7 is a table showing an example of quantization coefficients stored in the quantization table of FIG. 3;

FIG. 11 is a table showing the content of the coding parameter table of FIG. 3;

DESCRIPTION OF THE PREFERRED EMBODIMENT

Figure 1:
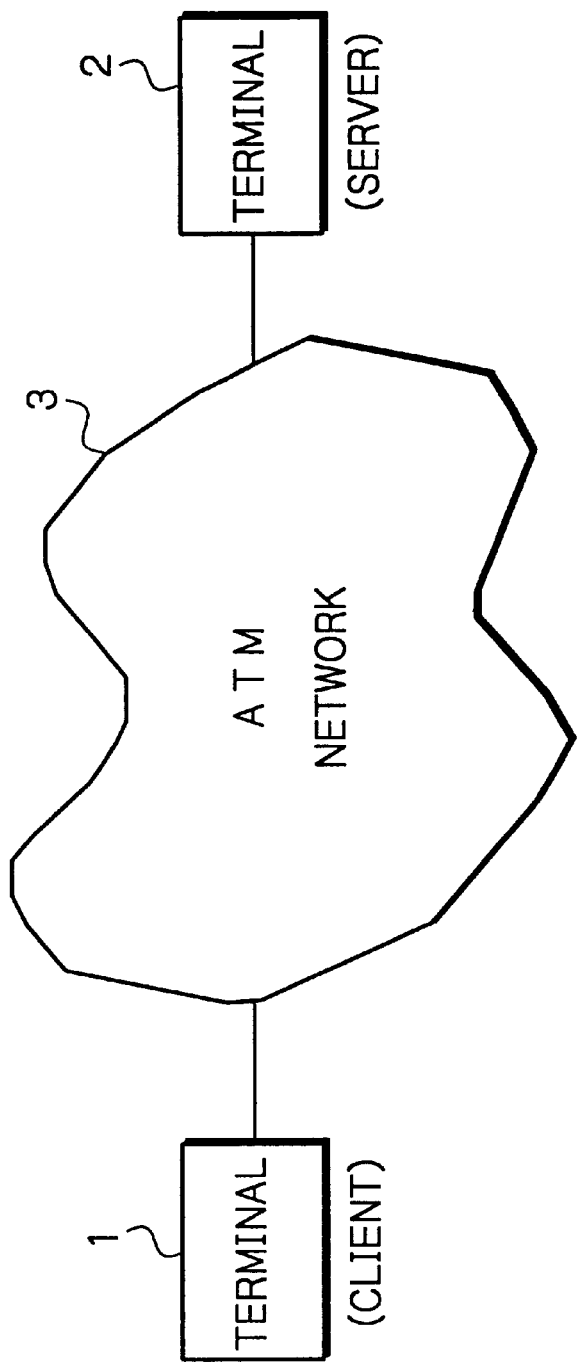
FIG. 1 is a diagram illustrating an ATM communication system to which an embodiment of the image transmission system according to the present invention is applied.

In FIG. 1, which illustrates an ATM communication system, a plurality of terminals such as 1 and 2 are connected via an ATM network 3. An embodiment of the image transmission system according to the present invention is applied to each of the terminals 1 and 2. For example, if the terminal 1 serves as a client and the terminal 2 serves as a server, ATM cells generated from the terminal 2 are transmitted via the ATM network 3 to the terminal 1.

Figure 2:
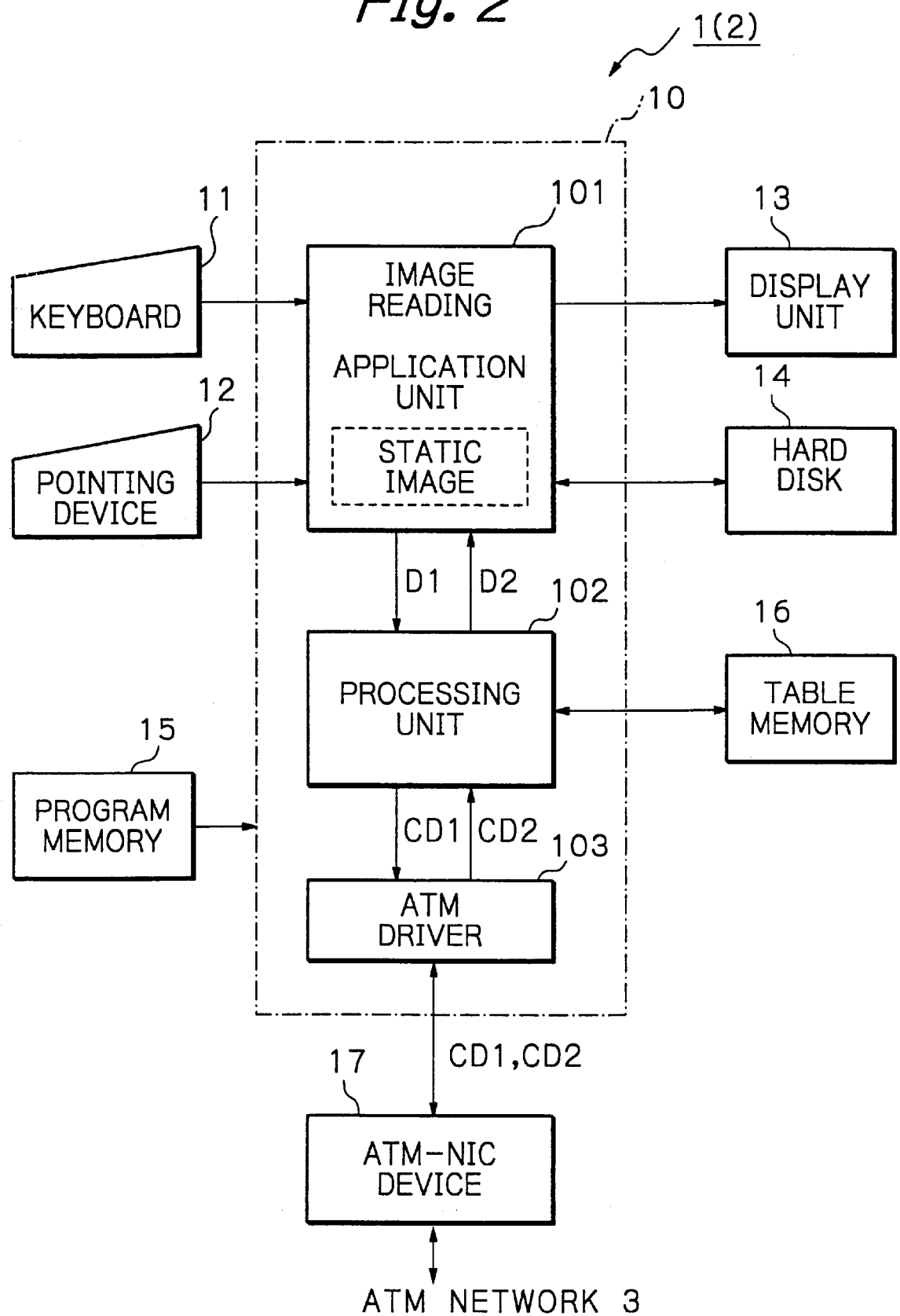
FIG. 2 is a detailed block circuit diagram of the terminal of FIG. 1.

In FIG. 2, which is a detailed block circuit diagram of the terminal 1 (2) of FIG. 1, reference numeral 10 designates a main control circuit connected to a keyboard 11 and a pointing device 12 as input means and a display unit 13. Also, a hard disk 14 for storing image data, a program memory 15 for storing a transmission control program and a table memory 16 for storing various tables are connected to the main control circuit 10. Further, an ATM network interface card (ATM-NIC) device 17 is connected between the main control circuit 10 and the ATM network 3.

The main control circuit 10 is constructed by an image reading application unit 101 connected to the keyboard 11, the pointing device 12, the display unit 13 and the hard disk 14, a processing unit 102 connected to the table memory 16, and an ATM driver 103.

Static image data D1 is transmitted from the image reading application unit 101 to the processing unit 102, while static image data D2 is transmitted from the processing unit 102 to the image reading application unit 101. Also, compressed static image data CD1 is transmitted from the processing nit 102 to the ATM driver 103, while compressed static image data CD2 is transferred from the ATM driver 103 to the processing unit 102. The ATM-NIC device 17 transforms the compressed static image data CD1 into an ATM cell format image data, while the ATM-NIC device 17 transforms an ATM cell format image data into the compressed static image data CD2. Note that the ATM-NIC device 17 is operated by software.

On the client side, the image reading application unit 101 stores the static image data D2 in the hard disk 14, and displays the static image data stored in the hard disk 14 on the display unit 13 upon receipt of the operator's request via the keyboard 11 or the pointing device 12.

On the server side, the image reading application unit 101 operates in accordance with the operator's request on the client side.

Figure 3:
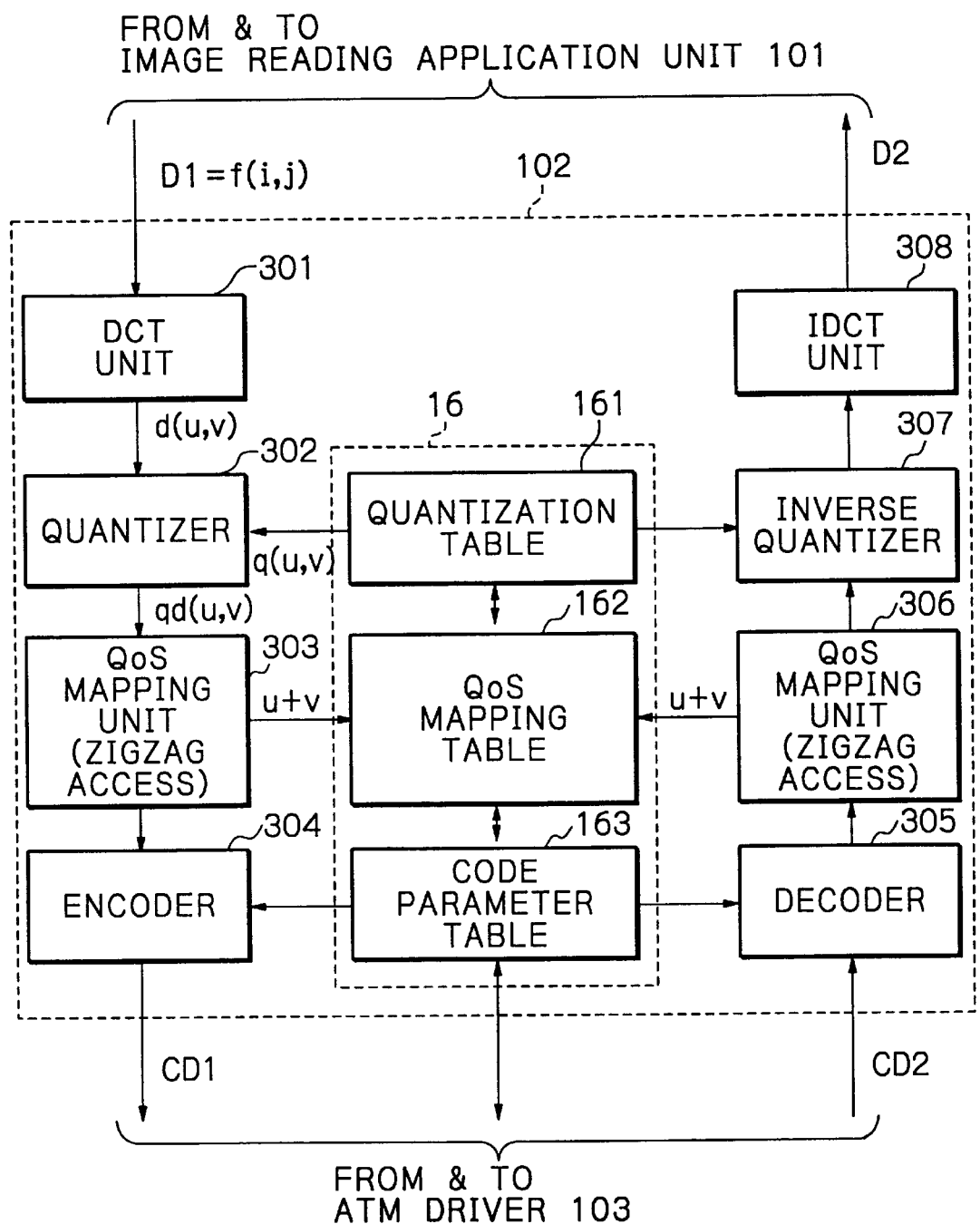
FIG. 3 is a detailed circuit diagram of the processing unit of FIG. 2.
Figure 4:
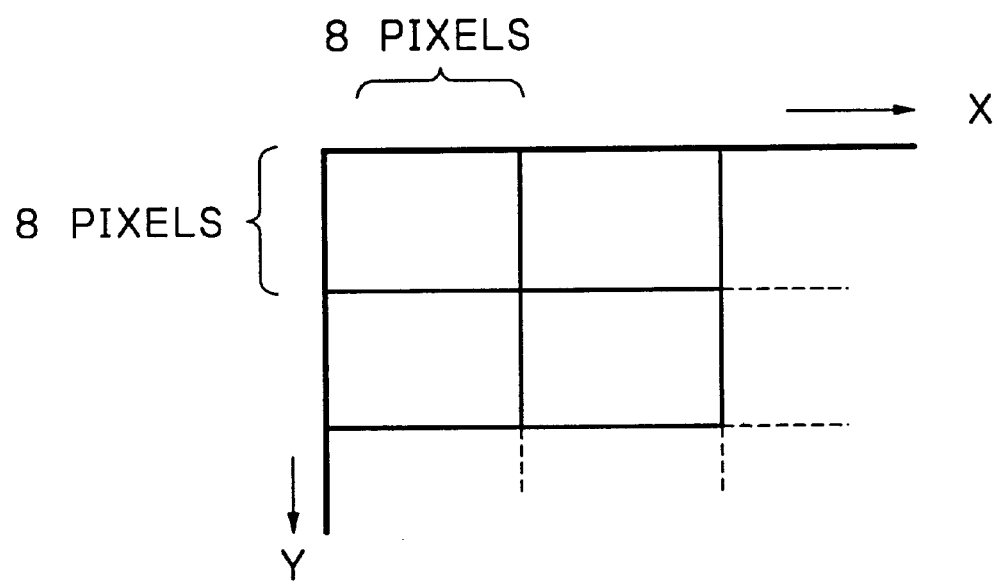
FIG. 4 is a diagram showing the entire image data processed in the image reading application unit of FIG. 3.
Figures 5A, 5B:
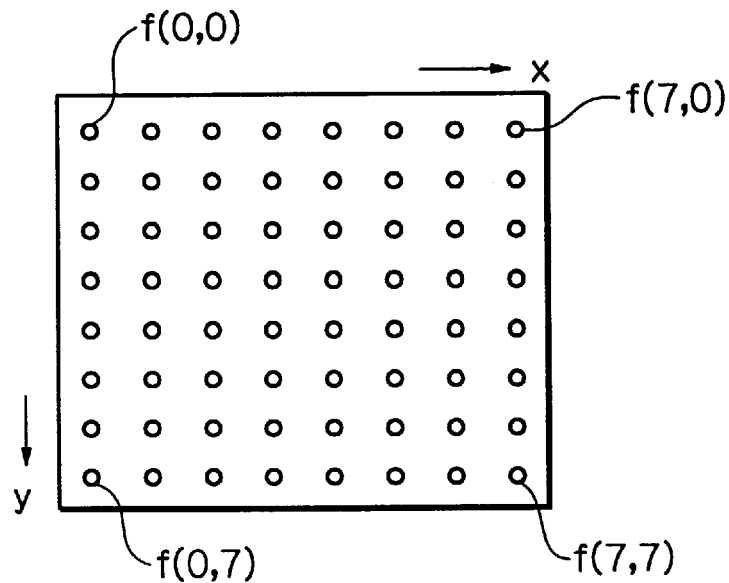
FIG. 5A is a diagram showing one 8×8—pixel block of the image data of FIG. 3.
FIG. 5B is a table showing an example of the pixel data of FIG. 5A.

In FIG. 3, which is a detailed block circuit diagram of the processing unit 102 of FIG. 2, the processing unit 102 receives an 8×8—pixel block image data D1 as shown in FIG. 4 from the image reading application unit 101. In this case, if each pixel of the 8×8—pixel block image data D1 is defined by a brightness data signal, 64 pixel data f (i, j) where i, j=0, 1, 2, . . . , 7 are arranged two-dimensionally as shown in FIG. 5A An example of the pixel data f (i, j) is shown in FIG. 5B.

Figures 6A, 6B:
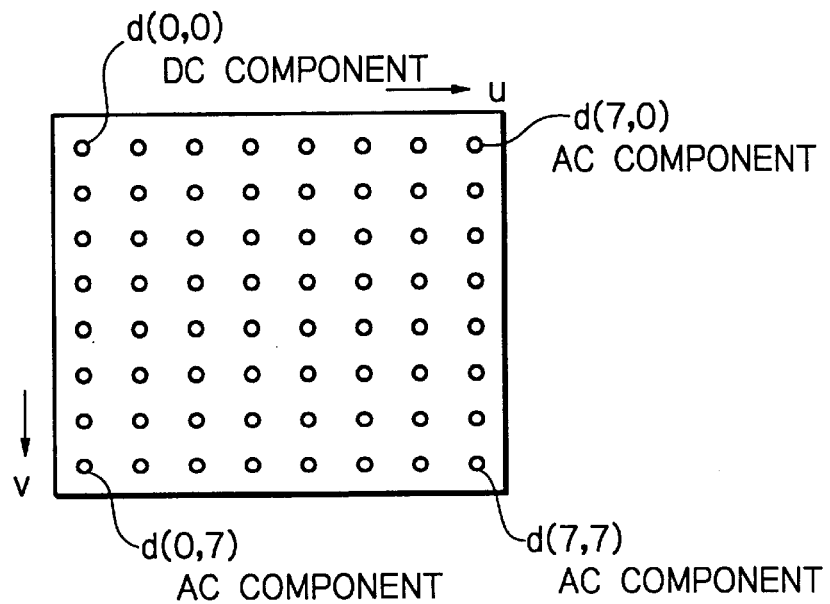
FIG. 6A is a diagram showing DCT coefficients obtained by the DCT unit of FIG. 3.
FIG. 6B is a table showing an example of the DCT coefficients of FIG. 6A.

The 64-pixel data f (i, J) is supplied to a discrete cosine transform (DCT) unit 301 which performs a DCT operation upon the 64-pixel data f (i, j) to generate 64 DCT coefficients d (u, v) where u, v=0, 1, . . . , 7, which are arranged two-dimensionally as shown in FIG. 6A. An example of the DCT coefficients d (u, v) is shown in FIG. 6B. Note that the DCT coefficient d (0, 0) is a DC component corresponding to a mean brightness value of all the 64 pixel data f (x, Y), and the other DCT coefficients d (u, v) are AC components.

The DCT coefficients d (u, v) are supplied to a quantizer 302 which performs a quantization operation upon the DCT coefficients d (u, v) using quantization coefficients q (u, v) stored in a quantization table 161 of the table memory 16. An example of the quantization coefficients q (u, v) is shown in FIG. 7. Therefore, the quantizer 302 calculates quantized DCT coefficients qd (u, v) by $$qd(u,v)=d(u,v)/q(u,v)$$

where qd (u, v) is an integer value.

Figures 8A, 8B:
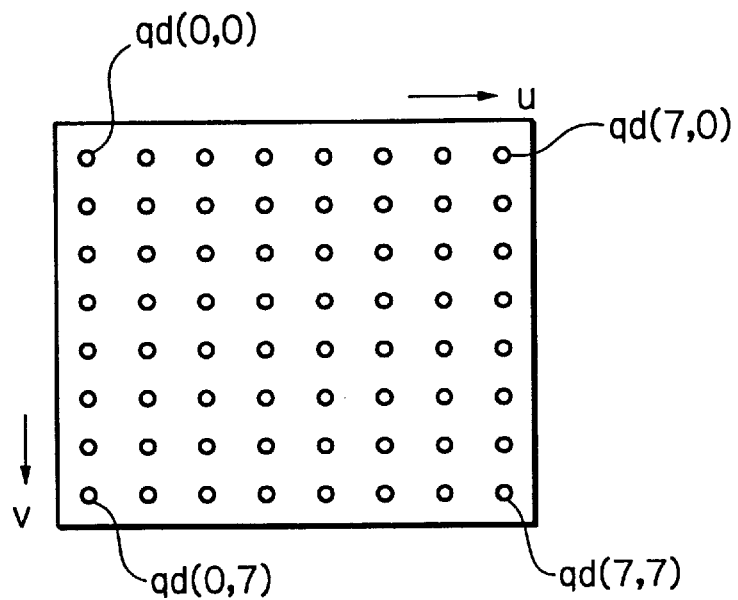
FIG. 8A is a diagram showing quantized DCT coefficients obtained by the quantizer of FIG. 3.
FIG. 8B is a table showing an example of the quantized DCT coefficients of FIG. 8A.

The quantized DCT coefficients qd (u, v) are arranged two-dimensionally as shown in FIG. 8A, and an example of the quantized DCT coefficients qd (u, v) is shown in FIG. 8B.

Figure 9:
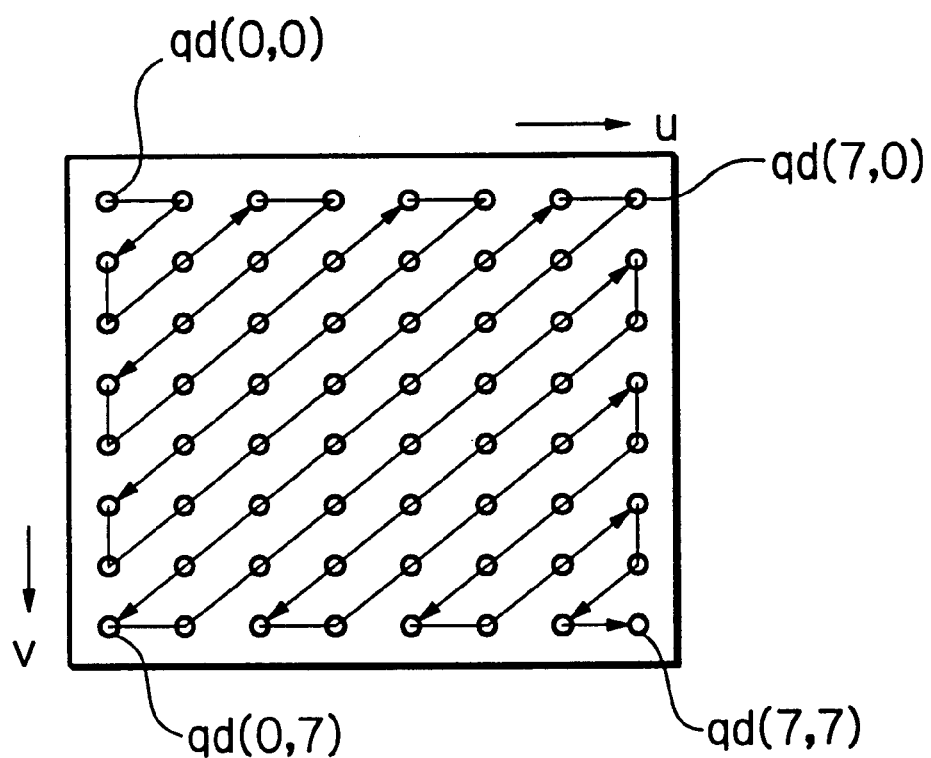
FIG. 9 is a diagram for explaining the zigzag access operation of the QoS mapping unit of FIG. 3.

The quantized DCT coefficients qd (u, v) are read by a QoS mapping unit 303 which has a zigzag access function as shown in FIG. 9. In this case, the QoS mapping unit 303 also accesses a QoS mapping table 162 of the table memory 16 by using a parameter u+v.

Figure 10A:
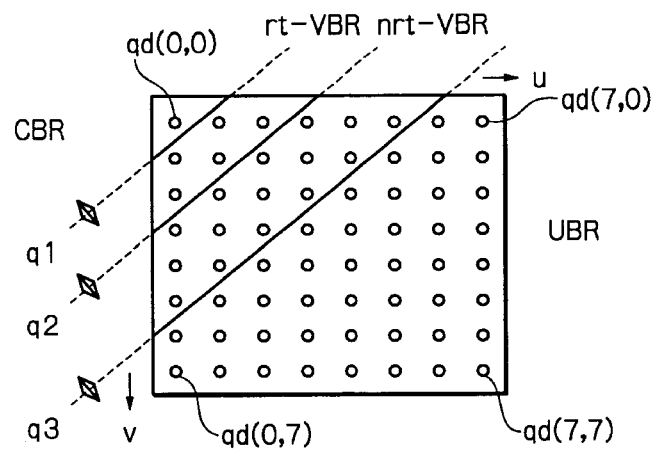
FIG. 10A is a diagram showing the content of the QoS mapping table of FIG. 3.
Figure 10B:
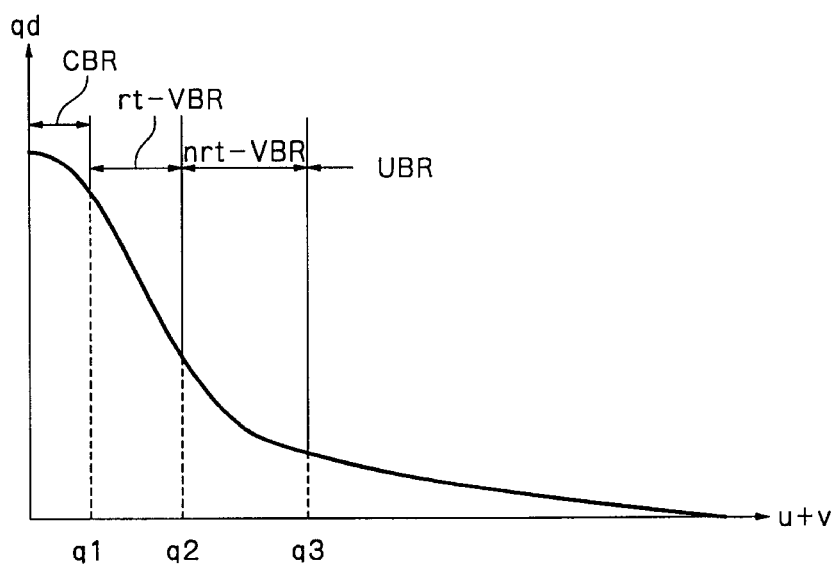
FIG. 10B is a graph for explaining the threshold values of FIG. 10A.

The content of the QoS mapping table 162 is shown in FIG. 10A. In FIG. 10A, four traffic service classes, i.e., the CBR service, the rt-VBR service, the nrt-VBR service and the UBR service are defined for four regions. That is, the quantized DCT coefficients qd (u, V) as shown in FIG. 8B have larger values as their frequency components are smaller, as shown in FIG. 10B. For example, if u+V=q1 (such as 0), the CBR service is defined. Also, if q1<u+v≦ q2 (such as 2), the rt-VBR service is defined. Further, if q2<u+v≦q3 (such as 5), the nrt-VBR service is defined. Still further, if U+v>q3, the UBR service is defined. That is, since the DC component of the DCT coefficients qd (u, v) greatly affect the quality of service, the CBR service which is of a band guaranteeing type is defined. Also, since the high order AC components of the DCT coefficients qd (u, v) hardly affects the quality of service, the UBR service which is of a best effort type is defined. In addition, the rt-VBR service and the nrt-VBR service are defined for the intermediate AC components of the DCT coefficients qd (u, v).

The threshold values q1, q2 and q3 are statistically-determined in advance in accordance with the distribution of the quantized DCT coefficients qd with respect to the value u+v. Also, traffic parameters such as a peak cell rate PCR, a substainable cell rate SCR, a maximum burst size MBS and the like are declared for each of the CBR service, the rt-VBR service, the nrt-VBR service and the UBR service.

The zigzag-scanned quantized DCT coefficients qd (u, v) are supplied to an encoder 304 which performs a compression operation upon the quantized DCT coefficients qd (u, v) using the coding parameter stored in a parameter table 163 of the table memory 16. For example, the encoder 304 uses a variable-length coding technology, i.e., an entropy coding technology such as a Huffman code as shown in FIG. 11 or an arithmetic code.

Thus, the encoder 304 generates compression data CD1 and transmits it to the ATM driver 103.

Simultaneously, the traffic service along with the traffic parameters is supplied directly to the ATM driver 103.

The ATM driver 103, which is in this case on the server side, transmits the compression data CD1 via virtual connections (VCs) to an ATM driver on the client side.

On the other hand, reverse operations are performed upon compression data CD2 from the ATM driver 103 which is in this case on the client side. That is, a decoder 305, a QoS mapping unit 306, an inverse quantizer 307 and an inverse DCT (IDCT) unit 308 carry out the reverse operations of the operations carried out by the encoder 304, the QoS mapping unit 303, the quantizer 302 and the DCT unit 301, respectively. Thus, image data D2 is restored.

Figure 12A:
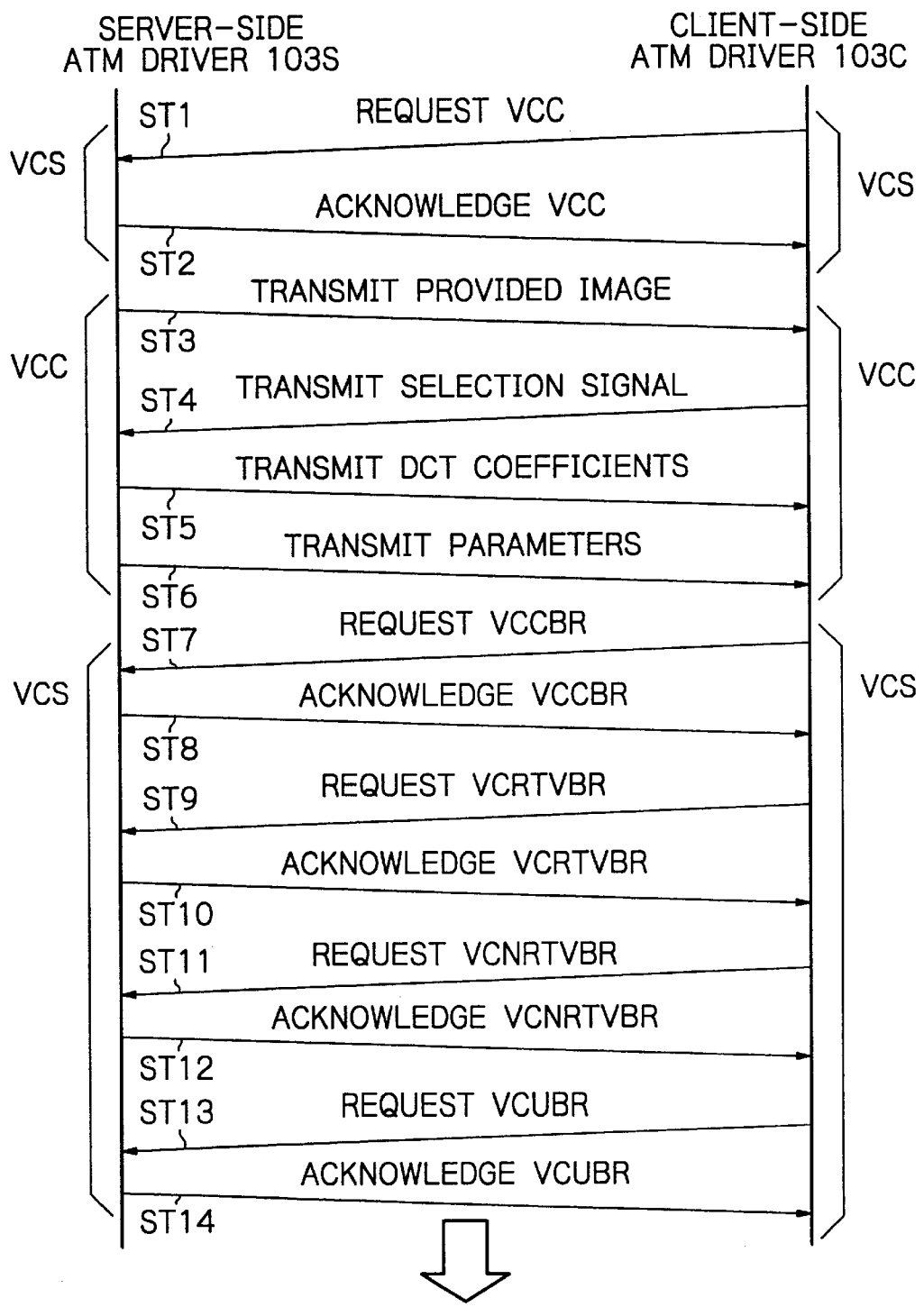
FIGS. 12A and 12B are sequence diagram explaining the operation of the processing unit of FIG. 3.
Figure 12B:
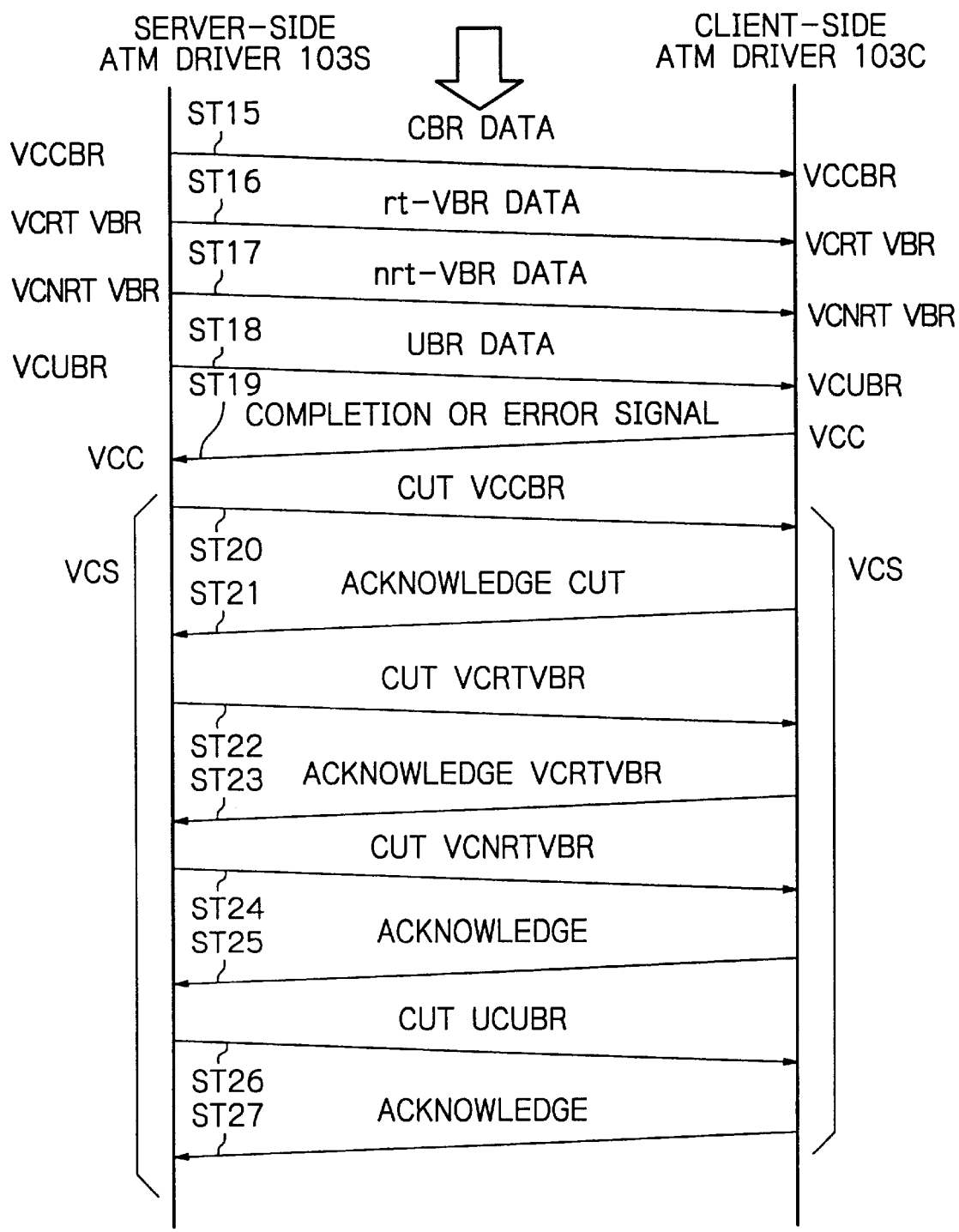

The operation of the ATM driver 103 is explained next with reference to FIGS. 12A and 12B. In FIGS. 12A and 12B, assume that reference 103S designates a server-side ATM driver and 103C designates a client-side ATM driver. Also, assume that a signaling virtual connection VCS is already established between the server-side. ATM driver 103S and the client-side ATM driver 103C within the ATM network 3.

First, as indicated by step ST1, the client-side ATM driver 103C generates a request for establishing a control virtual connection VCC and transmits it to the server-side ATM driver 103S via the signaling virtual connection SVC.

Next, as indicated by step ST2, the server-side ATM driver 103S generates an acknowledgement of establishing the control virtual connection VCC and transmits it to the client-side ATM driver 103C via the signaling virtual connection VCS.

Next, as indicated by step ST3, the server-side ATM driver 103S generates provided images and transmits them to the client-side ATM driver 103C via the control virtual connection VCC. Note that the provided images include sample image data or explanatory data. As a result, the provided images are displayed on the display unit 13 on the client side, so that the client-side operator generates a selection signal for selecting one of the provided images by using the keyboard 11 or the pointing device 12.

Next, as indicated by step ST4, the client-side ATM driver 103C transmits the above-mentioned selection signal via the control virtual connection VCC.

Next, as indicated by step ST5, the server-side ATM driver 103S generates quantized DCT coefficients qd (u, v) of a selected image block and transmits them via the control virtual connection VCC. In this case, note that the QoS mapping unit 303 and the encoder 304 on the server side are operated.

Next, as indicated by step ST6, the server-side ATM driver 103S transmits the parameters stored in the quantization table 161, the QoS mapping table 162 and the code parameter table 163 on the server side along with the ATM address of the server side to the client-side ATM driver 103C via the control virtual connection VCC.

After control information exchange between the client side ATM driver 103C and the server side ATM driver 103S is completed, virtual connections for data are established by steps ST7 through ST14 by the ATM address and the traffic parameters on the server side.

That is, as indicated by step ST7, the client-side ATM driver 103C generates a request for establishing a data virtual connection VCCBR for the CBR service and transmits it to the server-side ATM driver 103S via the signaling virtual connection VCS. Then, as indicated by step ST8, the server-side ATM driver 103S generates an acknowledgement of establishing the data virtual connection VCCBR via the signaling virtual connection VCS.

Also, as indicated by step ST9, the client-side ATM driver 103C generates a request for establishing a data virtual connection VCCBR for the rt-VBR service and transmits it to the server-side ATM driver 103S via the signaling virtual connection VCS. Then, as indicated by step ST10, the server-side ATM driver 103S generates an acknowledgement of establishing the data virtual connection VCCBR via the signaling virtual connection VCS.

Further, as indicated by step ST11, the client-side ATM driver 103C generates a request for establishing a data virtual connection VCNRTVBR for the nrt-VBR service and transmits it to the server-side ATM driver 103S via the signaling virtual connection VCS. Then, as indicated by step ST12, the server-side ATM driver 103S generates an acknowledgement of establishing the data virtual connection VCNRTVBR via the signaling virtual connection VCS.

Still further, as indicated by step ST13, the client-side ATM driver 103C generates a request for establishing a data virtual connection VCUBR for the UBR service and transmits it to the server-side ATM driver 103S via the signaling virtual connection VCS. Then, as indicated by step ST14, the server-side ATM driver 103S generates an acknowledgement of establishing the data virtual connection VCUBR via the signaling virtual connection VCS.

Next, four kinds of data are sequentially transmitted from the server-side ATM driver 103S to the client-side ATM driver 103C via the established data virtual connections VCCBR, VCRTVBR, VCNRTVBR and VCUBR. That is, as indicated by step ST15, CBR service data is transmitted from the server-side ATM driver 103S to the client-side ATM driver 103C via the data virtual connection VCCBR. Also, as indicated by step ST16, rt-VBR service data is transmitted from the server-side ATM driver 103S to the client-side ATM driver 103C via the data virtual connection VCRTVBR. Further, as indicated by step ST17, nrt-VBR service data is transmitted from the server-side ATM driver 103S to the client-side ATM driver 103C via the data virtual connection VCNRTVBR. Still further, as indicated by step ST18, UBR service data is transmitted from the server-side ATM driver 103S to the client-side ATM driver 103C via the data virtual connection VCUBR. As a result, the CBR service data, the rt-VBR service data, the nrt-VBR service data and the UBR service data are sequentially processed on the client side, so that all the received data are displayed on the display unit 13 or written into the hard disk 14 on the client side.

Next, as indicated by step ST19, after the client side confirms that all the received data are normal, the client-side ATM driver 103C generates a completion signal and transmits it to the server-side ATM driver 103S via the control virtual connection VCC. Note that, if the received data is abnormal, the client-side ATM driver 1030 generates an error signal instead of the completion signal and transmits it to the server-side ATM driver 103S via the control virtual connection VCC.

After transmission of all the image data from the server-side ATM driver 103S to the client-side ATM driver 103C is completed, the control proceeds to steps ST20 through ST27 where information regarding the cut of the four data virtual connections is transmitted by using the signaling virtual connection VCS. That is, as indicated by step ST20, the server-side ATM driver 103S cuts the data virtual connection VCCBR and informs it to the client-side ATM driver 103C via the signaling virtual connection VCS. Then, as indicated by step ST21, the client-side ATM driver 103C transmits an acknowledgement of the cut of the data virtual connection VCCBR via the signaling virtual connection VCS. Also, as indicated by step ST22, the server-side ATM driver 103S cuts the data virtual connection VCRTVBR and informs it to the client-side ATM driver 103C via the signaling virtual connection VCS. Then, as indicated by step ST23, the client-side ATM driver 103C transmits an acknowledgement of the cut of the data virtual connection VCRTVBR via the signaling virtual connection VCS. Further, as indicated by step ST24, the server-side ATM driver 103S cuts the data virtual connection VCNRTVBR and informs it to the client-side ATM driver 103C via the signaling virtual connection VCS. Then, as indicated by step ST25, the client-side ATM driver 103C transmits an acknowledgement of the cut of the data virtual connection VCNRTVBR via the signaling virtual connection VCS. Further, as indicated by step ST26, the server-side ATM driver 103S cuts the data virtual connection VCUBR and informs it to the client-side ATM driver 103C via the signaling virtual connection VCS. Then, as indicated by step ST27, the client-side ATM driver 103C transmits an acknowledgement of the cut of the data virtual connection VCUBR via the signaling virtual connection VCS.

Thus, the resources of all the data virtual connections are released, thus completing the operation.

In the above-described embodiment, one image data is divided into a plurality of 8×8 pixel blocks; however, this one image data can be divided into a plurality of N×N pixel blocks where N is 16, 32, . . . , for example. Also, the DCT unit 301 can be modified to process one image data.

Figure 13:
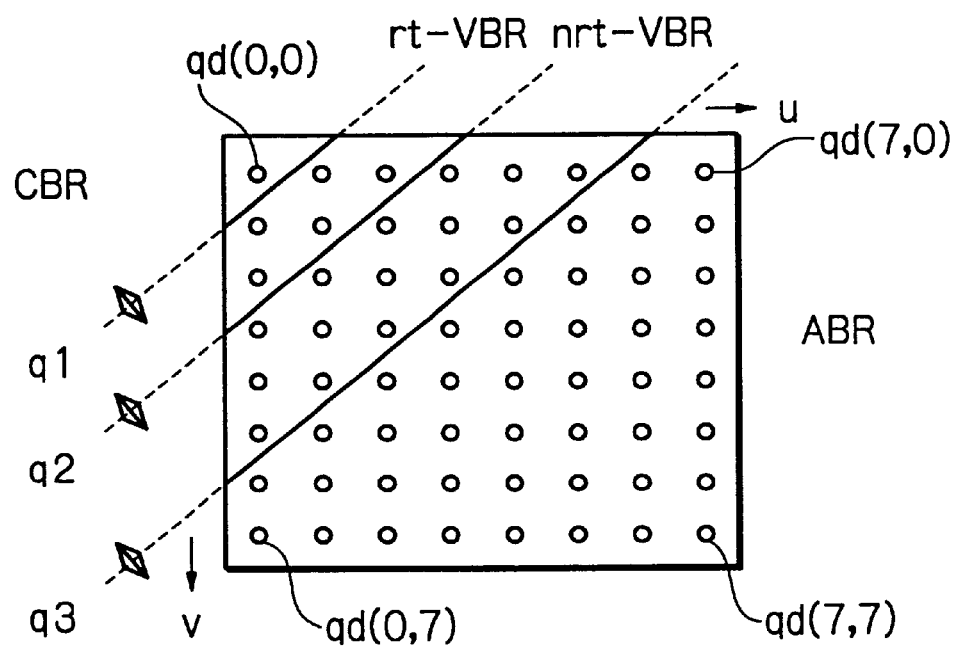
FIG. 13 is a diagram showing a modification of the diagram of FIG. 9.

In addition, the QoS mapping table 162 includes four traffic service classes; however, the QoS mapping table 162 can include five or more traffic service classes. Further, as illustrated in FIG. 13, an ABR service can be included instead of the UBR service in the QoS mapping table 162.

Additionally, in the above-described embodiment, a point-to-point connection between one server and a single client is illustrated; however, the present invention can be applied to a point-to-multipoints connection between one server and a plurality of clients.

As explained hereinabove, according to the present invention, since one image data is divided into a plurality of groups each corresponding to one traffic service class in accordance with the quality of service, effective use can be made of the band of an ATM network. Also, since the threshold values of the QoS mapping table are statistically-determined in advance, the user can read image information without being conscious of the quality of service of the ATM network.

What is claimed is:

1. An image transmission method using an asynchronous transfer mode (ATM) network, comprising the steps of:

performing a discrete cosine transformation (DCT) operation upon one image data to generate DCT coefficients as the frequency components of said image data;

performing a quantization operation upon said DCT coefficients using quantization coefficients to generate DCT coefficients;

dividing said quantized DCT coefficients into four or more groups each corresponding to one traffic service class of an ATM layer in accordance with frequency components of said image data, said groups being partitioned by threshold values which are statistically-determined in advance in accordance with a zigzag-scanned distribution of said quantized DCT coefficients;

establishing data virtual connections for all of said groups; and transmitting the groups of said image data via respective ones of said data virtual connections.

2. The method as set forth in claim 1, wherein a band guaranteeing type traffic service class of said ATM layer is defined for a low frequency component of said image data, best effort type traffic service classes of said ATM layer being defined for high frequency components of said image data.

3. An image transmission apparatus using an asynchronous transfer mode (ATM) network, comprising:

a digital cosine transform (DCT) unit for performing a DCT operation upon a first image data to generate first DCT coefficients;

a quantizer, connected to said digital cosine transform unit, for performing a quantization operation upon said first DCT coefficients to generate first quantized DCT coefficients, a first quality of service (QoS) mapping unit, connected to said quantizer, for dividing said first DCT coefficients into four or more groups each corresponding to one traffic service class of an ATM layer, said groups being partitioned by threshold valued which are statistically-determined in accordance with a zigzag-scanned distribution of said first quantized DCT coefficients;

an encoder, connected to said first QoS mapping unit, for encoding said first quantized DCT coefficients; and an ATM driver, connected to said encoder, for transmitting the groups of said first DCT coefficients via respective first data virtual connections.

4. The apparatus as set forth in claim 3, herein said ATM driver requests establishment of second data virtual connections and receives second DCT coefficients via respective ones of said second virtual connections, said apparatus further comprising:

a decoder, connected to said ATM driver, for decoding said second DCT coefficients;

a second QoS mapping unit, connected to said decoder, for rearranging said decoded second DCT coefficients in accordance with traffic service classes of said ATM layer;

an inverse quantizer, connected to said second QoS mapping unit, for performing an inverse quantization upon said rearranged second DCT coefficients; and an inverse DCT unit, connected to said inverse quantizer, for performing an inverse DCT operation upon said inversely quantized rearranged second DCT coefficients.

5. The apparatus as set forth in claim 4, wherein said first QoS mapping unit zigzag reads said first DCT coefficients from said DCT unit from the lowest frequency component to the highest frequency component, said second QoS mapping unit zigzag transmitting said decoded second DCT coefficients to said inverse DCT unit.

6. The apparatus as set forth in claim 3, wherein in a band guaranteeing type traffic service class of said ATM layer is defined for a low frequency component of said image data, best effort type traffic service classes of said ATM layer being defined for high frequency components of said image data.

* * * * *